United States Patent [19]

Noddings et al.

[11] 4,354,467
[45] Oct. 19, 1982

[54] VEHICLE SPEED CONTROL SYSTEMS

[75] Inventors: John Noddings, Coventry; Roland K. Borton, Rugby, both of England

[73] Assignee: Associated Engineering Limited, Leamington Spa, England

[21] Appl. No.: 189,847

[22] PCT Filed: Apr. 27, 1979

[86] PCT No.: PCT/GB79/00064
§ 371 Date: Jan. 31, 1980
§ 102(e) Date: Jan. 30, 1980

[87] PCT Pub. No.: WO79/01151
PCT Pub. Date: Dec. 27, 1979

[30] Foreign Application Priority Data
May 31, 1978 [GB] United Kingdom ............... 25333/78

[51] Int. Cl.³ .................. G05D 13/62; G06F 15/20; F02D 31/00
[52] U.S. Cl. ..................................... 123/352; 123/358
[58] Field of Search .......................... 123/358, 352; 180/105 E; 317/5

[56] References Cited
U.S. PATENT DOCUMENTS

| 3,648,798 | 3/1972 | Jania | 123/352 |
| 3,767,972 | 10/1973 | Noddings et al. | 123/352 |
| 3,886,921 | 6/1975 | Hafner | 123/352 |
| 4,133,406 | 6/1979 | Allerdist | 123/352 |
| 4,155,419 | 5/1979 | Mann | 123/352 |
| 4,177,516 | 12/1979 | Mason | 123/358 |
| 4,196,466 | 4/1980 | Noddings et al. | 123/352 |
| 4,211,193 | 7/1980 | Cox et al. | 123/352 |

Primary Examiner—Raymond A. Nelli
Attorney, Agent, or Firm—Leydig, Voit, Osann, Mayer & Holt, Ltd.

[57] ABSTRACT

A vehicle speed control system is disclosed in which a signal Vs representing actual vehicle speed is, when the vehicle is running at a desired speed, momentarily fed into, and then stored in, a memory. The memory therefore produces a signal representing desired speed. An error amplifier compares the signal Vm with a signal Vf which represents actual vehicle speed and which is derived from Vs via a filter. Any speed error causes a drive circuit to adjust the throttle of the vehicle engine so as to tend to correct the vehicle speed error. The vehicle-speed-dependent signal Vf is derived from the actual speed of the engine of the vehicle, and this signal is also fed to a comparator which compares it with a reference signal Vr representing an upper or lower limit for engine speed. When the comparison indicates that the engine speed has exceeded the level represented by the reference Vr (e.g. when the vehicle transmission is inadvertently disconnected), or has fallen below it in an alternative case, a control unit switches off the vehicle speed control system.

3 Claims, 1 Drawing Figure

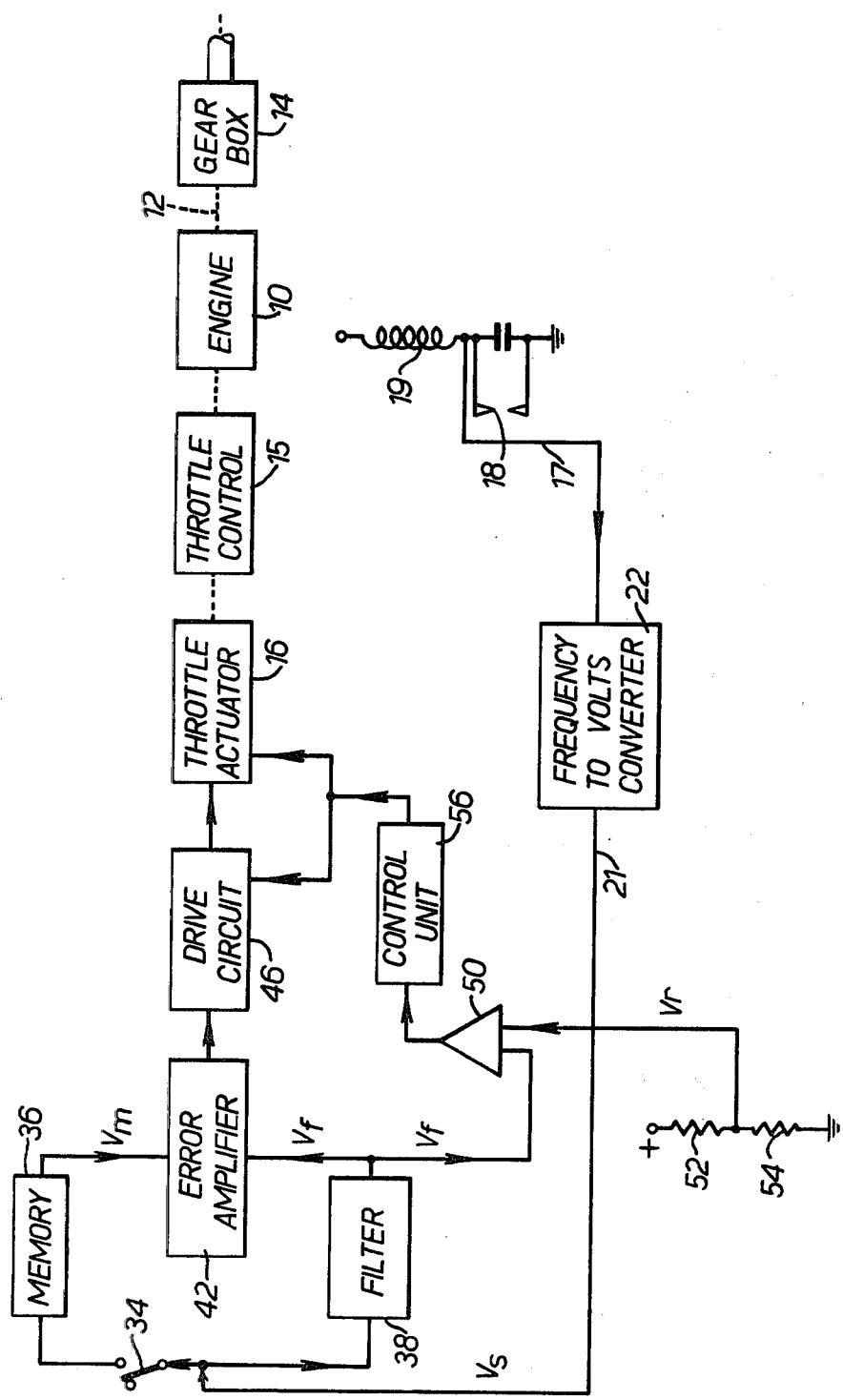

VEHICLE SPEED CONTROL SYSTEMS

BACKGROUND OF THE INVENTION

The invention relates to speed responsive systems and more particularly to speed responsive systems for vehicles whereby the vehicle may be kept at or about a predetermined speed.

Systems are known for automatically controlling a motor vehicle to run at a predetermined speed which is set by the driver. Once the speed has been selected and set by the driver, the system operates automatically to hold the vehicle at that speed, subject, of course, to the speed being within the capability of the vehicle having regard to the gradient of the road and similar factors.

It is also known in such systems to provide means for sensing various operating parameters of the vehicle so as to disable the speed control system automatically when one or more of these parameters changes in such a manner as to indicate that it is no longer safe or expedient to maintain the vehicle under automatic control of the speed control system. For example, it is known to disable a speed control system when the driver operates the brakes of the vehicle, such disabling being carried out, for example, by monitoring an electrical signal dependent on conditions in the brake lamp circuit of the vehicle.

An object of the invention is to provide an improved vehicle speed control system.

A more specific object of the invention is to provide a vehicle speed control system having improved means for disabling the system automatically in the event of certain conditions arising.

BRIEF SUMMARY OF THE INVENTION

In accordance with the invention, a vehicle speed control system is disclosed which is arranged, when rendered operative, to control the engine of the vehicle so as to tend to hold the vehicle to run at a desired speed, and is characterised by means responsive to the speed of the engine of the vehicle to render the system inoperative when the engine speed becomes outside a predetermined limit.

DESCRIPTION OF THE DRAWING

A vehicle speed control system embodying the invention will now be described, by way of example only, with reference to the accompanying drawing which is a circuit diagram, partly in block form, of the system.

DESCRIPTION OF PREFERRED EMBODIMENTS

The FIGURE shows the engine 10 of the motor vehicle driving the propeller shaft 12 through a gearbox or transmission 14, the speed of the engine being regulated by means of a throttle control 15. The control 15 will normally form part of the engine carburetter and is arranged to be adjustable by the driver's throttle pedal in the usual way. In addition, however, it is connected to be adjustable by means of a throttle actuator 16.

It will be appreciated that in relation to the application of the system to a diesel engine powered vehicle, the throttle control 15 would be replaced by the equivalent engine power control device.

The engine speed of the vehicle is sensed by means of a line 17, which, in this example, is connected across the engine contact breaker 18 through which the ignition coil 19 of the engine is supplied by the vehicle electrical system. In this way, a pulsating electrical signal exists on line 17 whose frequency is dependent on the engine speed. It will be appreciated that various other means can be used for producing an electrical signal dependent on the speed of the engine.

The speed dependent signal on line 17 is then passed to a frequency-to-voltage converter 22 which produces an output voltage Vs on a line 21 dependent on engine speed. In this embodiment, it is assumed that the signal Vs is inversely proportional to engine speed.

The circuit 22 may take any suitable form. It may, for example, comprise a limiting amplifier for converting the pulse signal on line 17 into a rectangular wave of constant amplitude, followed by a smoothing circuit.

The speed-dependent signal Vs is then fed, via a switch 34, to a memory 36 and is also fed directly to a filter 38. The memory 36 and the filter 38 produce respective outputs Vm and Vf which are both fed to an error amplifier 42. The latter drives a drive circuit 46 which in turn drives the throttle actuator 16.

The operation of the system as so far described is as follows.

When the driver wishes to bring the system into operation to control the vehicle to run at a particular speed, he accelerates the vehicle up to that speed (or decelerates it down to that speed) and momentarily closes switch 34 when the vehicle is running at the desired speed. This momentary closure of switch 34 feeds into the memory 36 a signal dependent on the engine speed corresponding to that vehicle speed. This signal becomes stored in the memory 36 when the switch 34 is once more open, and is fed as the signal Vm to one input of the error amplitude 42. The other input of the amplifier 42 receives the signal Vf from the filter 38.

The relationship between the signal Vf and the signal Vs depends on the characteristic of the filter. In this embodiment, Vf is affected by the rate of change of Vs so as to tend to change by a greater amount when Vs is changing rapidly than when Vs is changing slowly, and therefore leads on Vs when the engine speed is changing rapidly, in either sense.

For so long as the vehicle remains at the desired speed, the two inputs to the error amplifier 42 will be equal and the throttle actuator 16 will hold the throttle control unchanged. If the vehicle tends to change speed from the desired setting, however, there will be a resultant change in engine speed and Vf will change. The error amplifier 42 will produce a corresponding output which will energise the drive circuit 46 in such a direction as to cause the throttle actuator 16 to adjust the position of the throttle control 15 so as to tend to bring the vehicle back to the desired speed.

As shown in the FIGURE, the signal Vf is also fed to one input of a comparator 50 whose other input receives a reference signal Vr which is obtained from a potential divider comprising resistors 52 and 54 connected across the vehicle electrical supply. When the comparator 50 detects that Vf has become less than Vr (indicating that the engine speed has risen above the level represented by Vr), the output of the comparator 50 changes state and activates a control unit 56 which switches off the drive circuit 46 and the throttle actuator 16 so as to prevent the control system from further exerting any control function on the engine throttle. This ensures that the control system is prevented from causing overspeeding of the engine. For example, if the driver were inadvertently to bring the control system into operation while he had disengaged the clutch, then the system might open the engine throttle in order to increase the vehicle speed which would result in possible overspeeding of the engine and damage or danger when the driver re-engaged the clutch. The comparator 50 also provides a safety feature in the event of malfunction of any part of the system resulting in engine overspeed.

The control unit 56 may be part of control logic which may be provided for switching the system into operation under control of the driver (so as to control the vehicle to run at a desired speed or to accelerate up to or decelerate down to, or to resume, a desired speed), and to switch it out of operation in response to the driver's operation of, for example, the vehicle brake, throttle pedal or gear change mechanism. One form of such control logic is disclosed in U.S. Pat. No. 4,140,202.

The voltage Vr would of course be set to represent a vehicle speed above the normal vehicle cruising speed. As the characteristic of the filter 38 is such that rapid changes of engine speed cause the signal Vf to lead on the changes in engine speed, the protective action provided by the comparator 50 comes into operation earlier for rapid increases in engine speed.

Where the basic control system is arranged such that its vehicle-speed responsive signal Vs is derived in dependence on the actual vehicle speed (such as being produced by a transducer associated with the vehicle propellor shaft), then comparator 50 would not be connected to receive an input directly derived from Vs. Instead, an additional signal dependent on actual engine speed, could be produced and fed (instead of the signal Vf in the FIGURE) to the comparator 50 for the purposes of disconnecting the system in the event of engine overspeed.

Moreover, a similar circuit may also be employed to cut out the automatic control below a predetermined speed. In this case the reference signal Vr will represent the predetermined speed, and the comparator 50 will be arranged to activate the control unit 56 when the value of Vf corresponds to the predetermined minimum speed, i.e. when Vf is inversely proportional to speed, when Vf rises to a value equal to or exceeding Vr.

In this way, it is possible to ensure that the speed control is not inadvertently engaged at, for example, very low speeds in top gear.

We claim:

1. A vehicle speed control system, comprising memory means for storing a road speed reference signal representing a desired road speed for the vehicle, means operative to produce an input signal at least normally representing the actual road speed of the vehicle, first comparing means operative to compare the road speed reference signal and the input signal whereby to produce a first control signal dependent on the difference, if any, between the two signals compared, first control means responsive to the first control signal so as to adjust the engine power in a direction and by an amount tending to hold the actual road speed of the vehicle at the desired road speed value, means operative to generate an engine speed reference signal representing a desired maximum engine speed which is fixed and independent of the actual road speed of the vehicle, second comparing means connected to compare the engine speed reference signal with a signal representing the actual speed of the engine and independent of the actual road speed of the vehicle whereby to produce a second control signal when the actual engine speed exceeds the value thereof represented by the engine speed reference signal, and second control means responsive to the second control signal to disable the first control means so as to render the first control means incapable of adjusting the engine power.

2. A system according to claim 1, in which the means operative to produce the input signal comprises circuitry producing an electrical signal representing the speed of the engine of the vehicle, and the second comparing means receives the said signal representing the actual speed of the vehicle as a signal derived from the said electrical input signal.

3. A control system according to claim 2, in which the input signal is derived by passing a signal dependent on the engine speed through a signal translating circuit having a characteristic such that the input signal leads on the engine speed when the engine speed is changing rapidly.

* * * * *